United States Patent [19]

Tanaka

[11] 4,303,208

[45] Dec. 1, 1981

[54] FRICTION CLUTCH OPERATED REDUCED TENSION SAFETY RETRACTION MEANS

[75] Inventor: Akira Tanaka, Northridge, Calif.

[73] Assignee: American Safety Equipment Corp., Troy, Mich.

[21] Appl. No.: 733,356

[22] Filed: Oct. 18, 1976

Related U.S. Application Data

[63] Continuation-in-part of Ser. No. 680,111, Apr. 26, 1976, Pat. No. 4,026,494, and Ser. No. 701,504, Jul. 1, 1976, Pat. No. 4,113,200.

[51] Int. Cl.³ .................. A62B 35/02; B65H 75/48
[52] U.S. Cl. ........................... 242/107; 242/107.4 R
[58] Field of Search ........................ 242/107–107.7; 297/474–479; 280/801–808; 180/268–270; 185/39

[56] References Cited

U.S. PATENT DOCUMENTS

| | | | |
|---|---|---|---|
| 2,658,698 | 11/1953 | Leroy | 242/107 |
| 3,194,344 | 7/1965 | Sindlinger | 185/39 |
| 3,337,155 | 8/1967 | Binding | 242/107 |
| 3,834,646 | 9/1974 | Heath | 242/107.7 |
| 3,880,364 | 4/1975 | Andres | 242/107.4 R |
| 3,957,222 | 5/1976 | Bladh | 242/107 |
| 3,984,063 | 10/1976 | Knieriemen | 242/107.4 R X |
| 3,997,126 | 12/1976 | Karlsson | 242/107.4 R X |
| 4,002,219 | 1/1977 | Steinmann | 242/107 X |

Primary Examiner—John M. Jillions
Attorney, Agent, or Firm—Poms, Smith, Lande & Rose

[57] ABSTRACT

A safety belt retractor of the emergency locking type having a safety belt wound upon a spool rotatably journaled in a retractor frame is provided with a friction clutch operated dual tension belt retraction means wherein a first biasing means is provided for biasing the spool in a belt rewind direction, friction clutch means are interconnected between a second biasing means and the first biasing means and actuator means are provided for operating the friction clutch means to selectively apply and prevent operation of the second biasing means upon the first biasing means.

13 Claims, 10 Drawing Figures

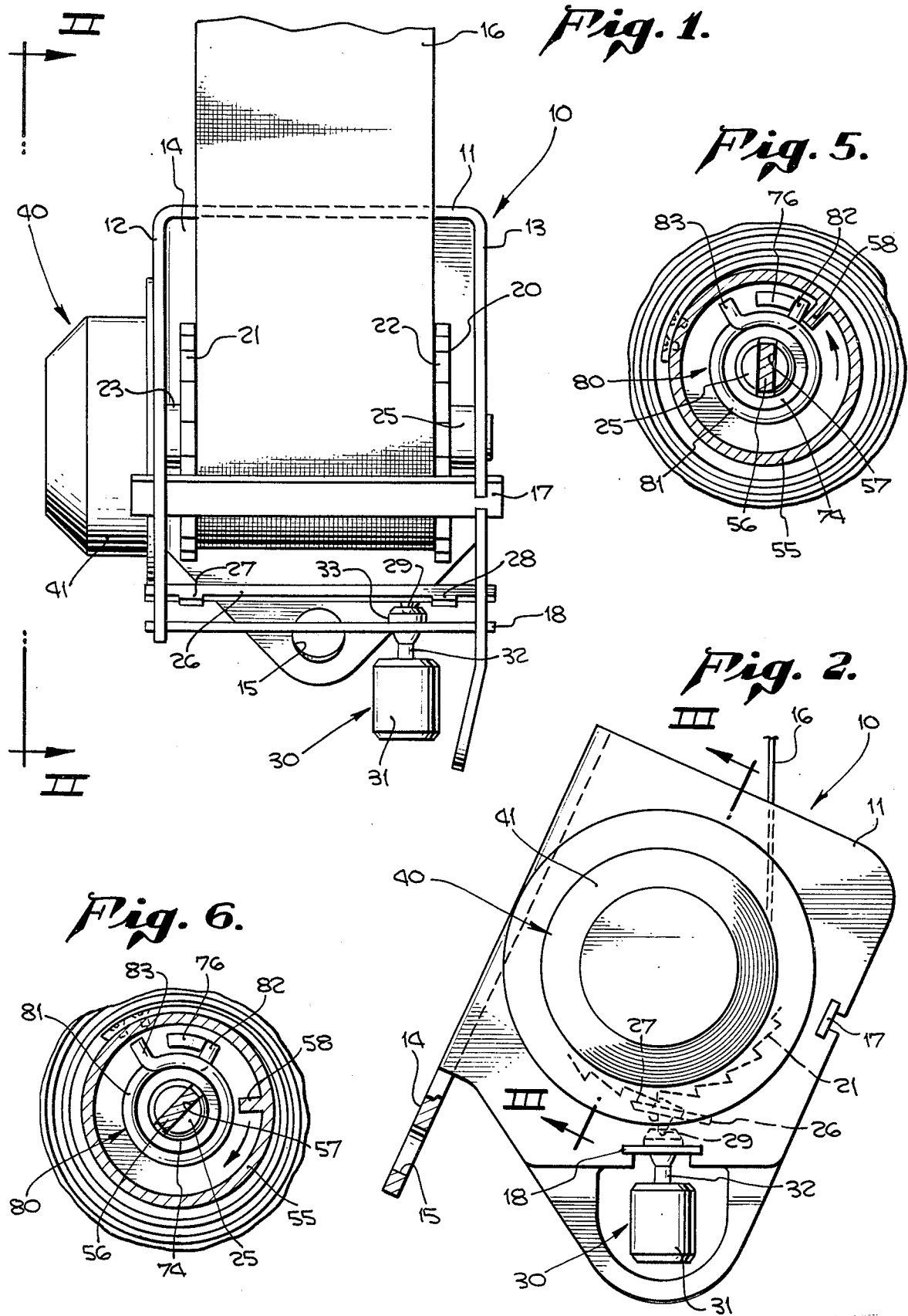

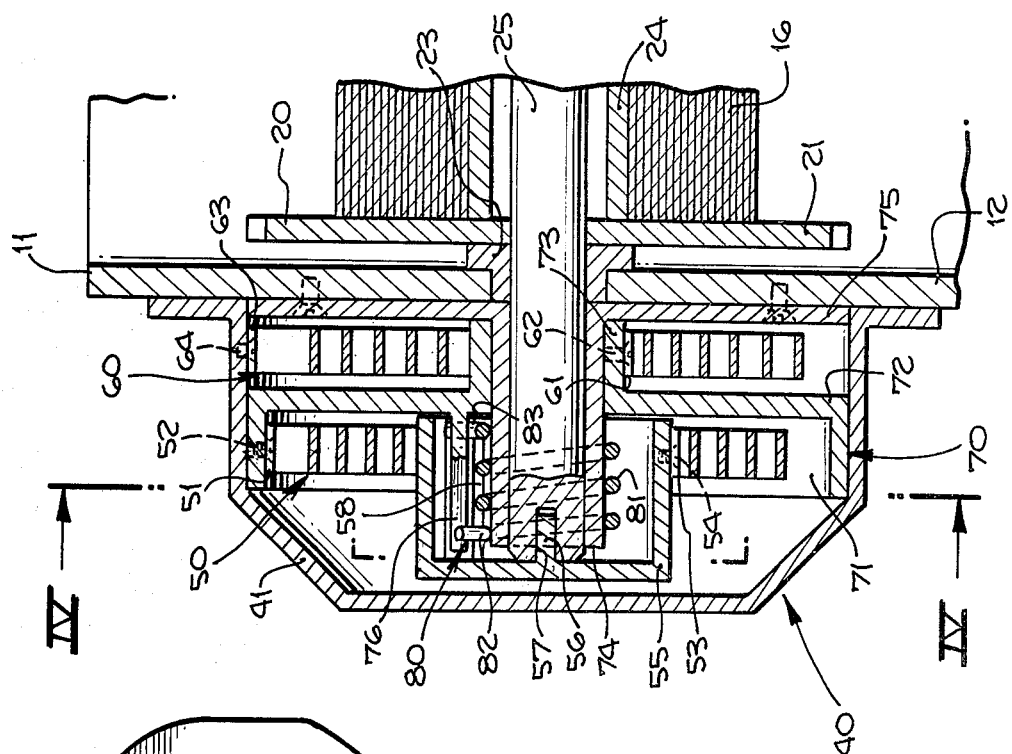
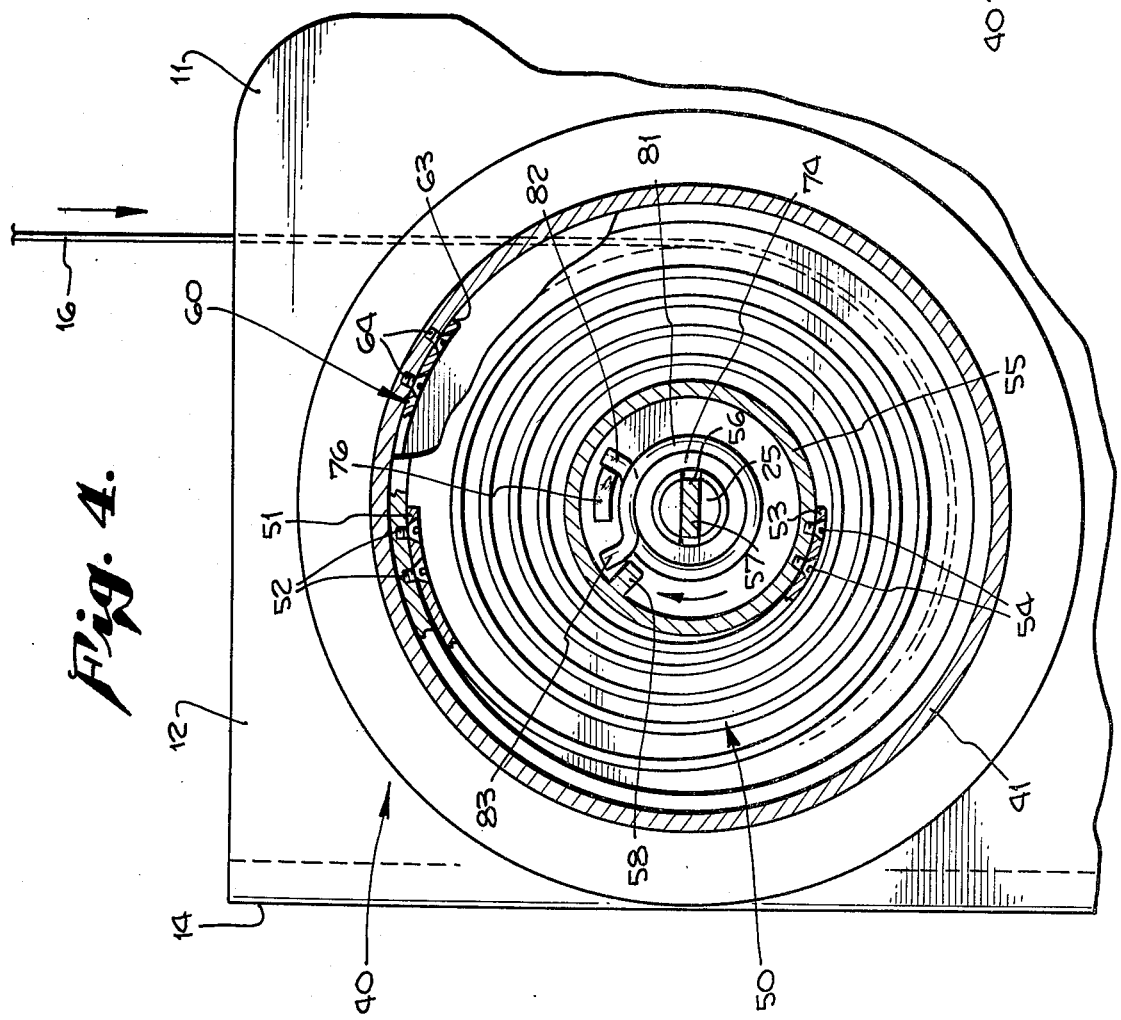

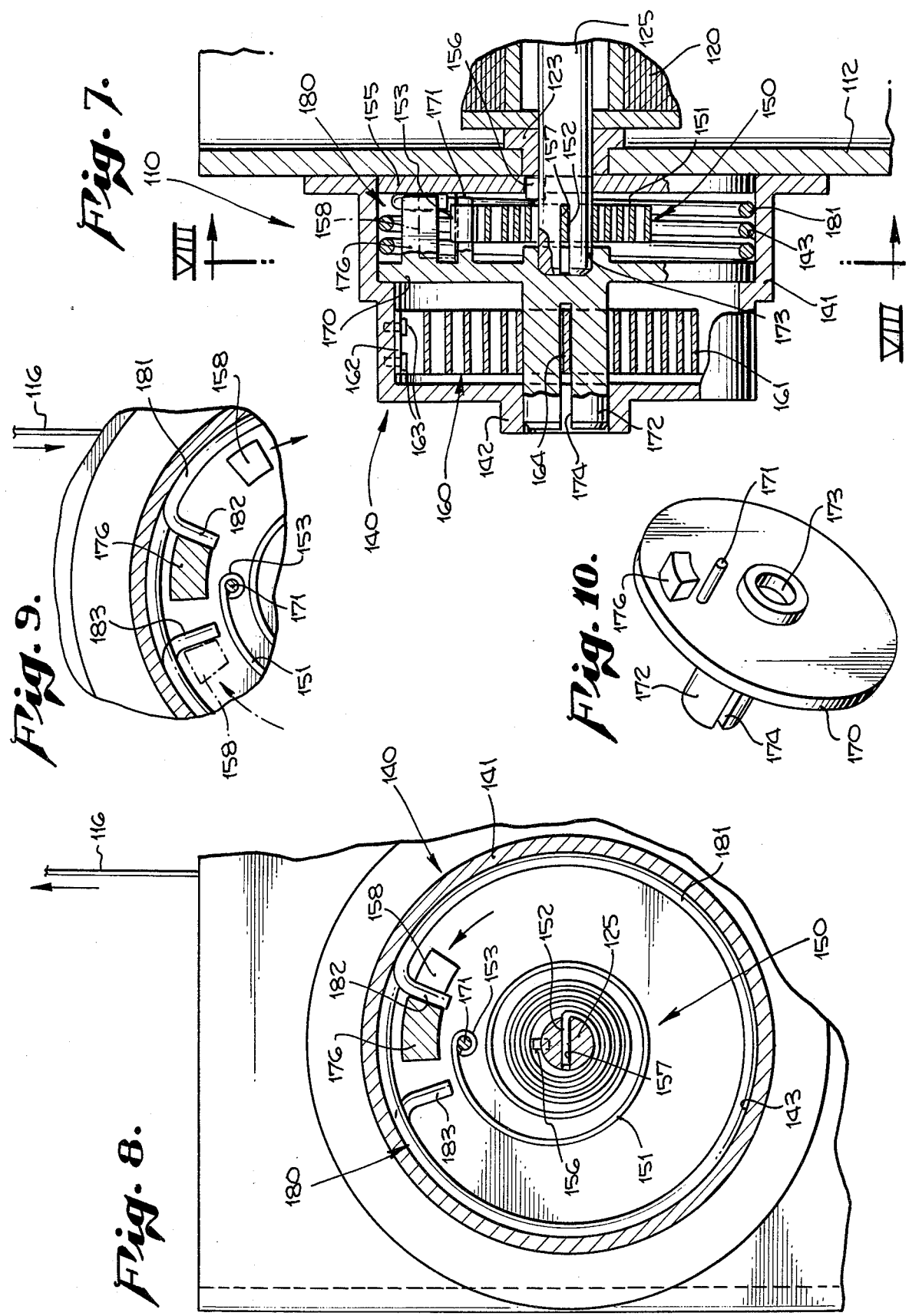

FRICTION CLUTCH OPERATED REDUCED TENSION SAFETY RETRACTION MEANS

RELATIONSHIP TO PRIOR APPLICATIONS

This application is a continuation-in-part of both application Ser. No. 680,111, filed Apr. 26, 1976, now U.S. Pat. No. 4,026,494 and application Ser. No. 701,504, filed July 1, 1976, now U.S. Pat. No. 4,113,200.

BACKGROUND OF THE INVENTION

This invention relates in general to safety belt retractors of the emergency locking type having a safety belt wound upon a spool biased by belt retraction biasing means toward a belt stored condition and more particularly to such belt retraction biasing means which provide for a reduced belt tension or "low tension zone" affect on the safety belt when placed in use. In the prior U.S. Pat. No. 3,834,646 an emergency locking type safety belt retractor is provided with belt tension relieving means wherein the retraction spring is blocked against biasing the spool in a belt rewind direction in response to a belt protraction, retraction and then protraction movement. I have considered it desirable to provide such a belt tension reducing means for safety belt retractors but where the belt manipulation to effect the reduced tension condition is more simply accomplished and wherein means may be provided for applying a reduced tension upon the belt when it is placed in use to maintain the belt relatively taut and avoid a loose belt condition.

I have found that it would be desirable to provide a reduced tension retraction means for emergency locking type safety belt retractors wherein a friction clutch means is employed for controlling application of a belt retraction biasing means which provides for a simply manufactured and easily operated safety belt retractor construction.

SUMMARY OF THE INVENTION

It is therefore the primary object of the present invention to disclose and provide an improvement in reduced tension safety belt retraction means for use in safety belt retractors, including emergency locking types, which will be easily manufactured, simply operated and reliable in their achieving a reduced tension effect for the safety belt when the belt is placed in use through normal manipulation thereof.

Generally stated, the present invention contemplates the provision of an additional biasing means, as a retractor spring normally employed in current commercial retractors, for biasing a belt retraction biasing means which biases the belt storage spool in a belt rewind direction in a safety belt retractor, as current retractors of the emergency locking type. As particularly contemplated within the present invention, friction clutch means are interconnected between such additional biasing means and the belt retraction biasing means for selectively blocking out the bias of the additional biasing means on normal belt manipulation. Specifically, actuator means are connected to the spool and are engageable with the friction clutch means for operating the clutch means to block out the bias of the additional biasing means in response to spool rotation in a predetermined manner, as in response to a slight retraction movement of the spool following protraction of the belt to a position of use.

In various embodiments of the present invention, interconnecting means are provided for interconnecting the belt retraction and additional biasing means to act in an interdependent manner as well as for the belt retraction biasing means acting in an independent manner when the friction clutch means blocks out the additional biasing means.

In a first preferred exemplary embodiment, the friction clutch means of the present invention comprises a confining torsion spring seated about a stationary mating member which is adapted to trap the aforesaid interconnecting member except when the torsion spring is engaged by an actuator member rotatable with the spool. In a second exemplary embodiment, the friction means includes an expanding torsion spring seated within a surrounding cylindrical housing for normally holding the interconnecting means stationary except when it is engaged by the actuator means which is responsive to spool rotation of a predetermined manner.

It is submitted that a more complete understanding of the present invention in clutch operated reduced tension safety belt retraction means, as well as a better appreciation for the objects of the present invention as well as a realization of various advantages thereof, will be afforded to those skilled in the art from a consideration of the following detailed explanation of a preferred and two alternative exemplary embodiments thereof within the present invention. Reference will be made to the appended sheets of drawings which will be described briefly first.

BRIEF DESCRIPTION OF THE DRAWINGS

FIG. 1 is a front view of an exemplary embodiment of emergency locking safety belt retractor employing a preferred exemplary embodiment of the friction clutch operated reduced tension belt retraction means in accordance with the present invention;

FIG. 2 is a side view of the retractor of FIG. 1 taken therein along the plane II—II;

FIG. 3 is a section view taken along the plane III—III in FIG. 2 showing the preferred exemplary embodiment in friction clutch operated reduced tension belt retraction means of the present invention;

FIG. 4 is a section view taken along the plane IV—IV in FIG. 3 showing the retraction means in a belt retraction mode;

FIG. 5 is a detail view of the retraction means of FIG. 4 showing retraction means in a belt protraction mode;

FIG. 6 is a detail view as in FIG. 5 showing the retraction means in a "low tension" mode due to a belt retraction movement following a belt protraction as shown in FIG. 5;

FIG. 7 is a section view as in FIG. 3 of a first alternative exemplary embodiment of retraction means in accordance with the present invention shown in a belt protraction mode;

FIG. 8 is a section view of the retraction means of FIG. 7 taken therein along the plane VIII—VIII;

FIG. 9 is a detail view of a portion of the retraction means of FIG. 8 showing the retraction means in a "low tension" mode due to a belt retraction movement following a belt protraction as in FIG. 8; and FIG. 10 is a detail view of a portion of the retraction means of the first alternative exemplary embodiment of FIGS. 7 through 9.

DETAILED DESCRIPTION OF THE PREFERRED EXEMPLARY EMBODIMENT

An exemplary embodiment of emergency locking safety belt retractor is indicated generally at 10 in FIGS. 1 and 2 which may be made in accordance with U.S. Pat. No. 3,889,898 with the addition of the present improvement in reduced tension belt retraction means indicated generally at 40. The disclosure of said patent is incorporated herein by reference, details of the retractor being mentioned herein for purposes of describing an exemplary embodiment of safety belt retractor with which the present invention in retraction means may be employed.

As seen in FIGS. 1 and 2, the exemplary retractor, indicated generally at 10, includes a conventional U-shaped retractor frame 11 including side walls 12 and 13 connected by mounting base 14. It is contemplated that the retractor frame is to be mounted in a vehicle, such as an automobile, by a mounting plate aperture 15 and associated fastening means, to position safety belt 16 for use as is now conventionally known in a safety harness restraint system for the vehicle passenger.

Belt 16 is wound in conventional manner upon the retractor spool 20 which includes a pair of ratchet wheels 21 and 22 mounted adjacent a center arbor 24 and on spool shaft 25. Shaft 25 is journaled in conventional manner in frame side walls 12 and 13, by end bushings, as bushing 23 as seen in FIG. 3, the side walls being interconnected by cross braces 17 and 18 in known manner.

In the exemplary retractor, indicated generally at 10, a lock bar 26 is pivotally mounted by side walls 12 and 13 in position to be tilted by an associated vehicle inertia sensor, indicated generally at 30, to bring its locking pawls 27 and 28 into engagement with teeth of the ratchet wheels 21 and 22. The exemplary vehicle inertia sensor means includes pendulum mass 31 suspended by stem 32 from head 33 pivotally mounted by an apertured seat formed in cross brace. An upper surface of head 33 may be provided with a concave configuration to underlie and cam a follower 29 provided on the underside of lock bar 26 to cause the aforesaid tilting movement of lock bar 26 to lock the retractor against belt protraction in the event of a change in vehicle inertia as is known in the art.

The preferred exemplary embodiment of clutch operated reduced tension retraction means, in accordance with the present invention, indicated generally at 40 in FIGS. 1 and 2, is shown in detail in FIGS. 3 and 4. As seen in FIG. 3, there are two biasing means provided within housing 41, such biasing means comprising a first biasing spring means indicated generally at 50 and a second biasing spring means indicated generally at 60.

As contemplated within the present invention, interconnecting means are provided for interconnecting the first and second biasing means facilitating their interaction as hereinafter explained. Such interconnecting means in the exemplary embodiment comprises member 70 which is provided with a cylindrical shell 71 formed integrally of web 72 and apertured boss 73. As seen in FIG. 3, member 70 is rotatably mounted coaxially of spool shaft 25 on a stationary stub shaft 74 which has an integrally formed base flange 75 fixedly secured to retractor frame sidewall 12. An inner end 61 of spring means 60 is secured by suitable fasteners 62 to boss 73 of the interconnecting member 72 while an outer end 63 of the spring means is connected by fasteners 64 to housing 41. An outer end 51 of spring means 50 is connected by suitable fasteners 52 to the cylindrical shell 71 of interconnecting member 70 completing the connection between the spring means 50 and 60. An inner end 53 of spring means 50 is connected by fasteners 54 to an end cap 55 secured to spool shaft 25 through a press fit engagement between web 56 formed integrally of cap 55 and end slot 57 formed in the end of shaft 25.

From the foregoing, it can be seen that spring means 50 and 60 are provided so that on a protraction of belt 16 and consequent rotation of shaft 25 in a counterclockwise direction in FIG. 4, shaft 25 will rotate end cap 55 tightening spring 50 which in turn acts through interconnecting member 70 to tighten spring 60.

Friction clutch means are provided in the preferred exemplary embodiment, as particularly contemplated within the present invention, for selectively relieving a portion of the combined biasing effect of springs 50 and 60 to provide a reduced tension or "low tension zone" effect for belt 16 when it is placed in use about a vehicle passenger utilizing a safety restraint system in which the belt is a component part. Referring to FIGS. 3 and 4, in the preferred exemplary embodiment, such friction clutch means is indicated generally at 80 interconnected between the first biasing spring means 50 and the spool via spool shaft 25. Specifically, a torsion coil spring 81 is seated about stub shaft 74 to normally frictionally grip the stub shaft 74 which is held stationary through its being secured by flange 75 to retractor side wall 12. Torsion coil spring 81 is so provided, in accordance with the present invention, that it can be loosened to revolve about stub shaft 74 upon the application of a loosening force upon either of the spring ends 82 or 83 as subsequently explained. As seen in FIG. 4, spring ends 82 and 83 are positioned to trap arm 76 of interconnecting member 70 therebetween to hold interconnecting member 70 stationary when spring 81 is stationary and to allow it to rotate freely when spring 81 is rotating freely in a clutch release position as hereinafter explained.

Actuator means are provided in accordance with the present invention for actuating the friction clutch means including spring 81 to a release position in response to a predetermined movement of spool 20. As best seen in FIGS. 3 and 4, spool shaft end cap 55 is provided with an actuator arm 58 which is formed integrally of cap 55 and extending longitudinally thereof as seen in FIG. 3 and projecting radially inwardly thereof as seen in FIG. 4. Actuator arm 58 is thus positioned to engage either of the spring arms 82 and 83 in response to spool rotation to release the torsion spring 81 from its gripping engagement with stationary stub shaft 74 during operation of the retractor as will now be explained.

On protraction of safety belt 16, spool 20 revolves in a counterclockwise direction in FIGS. 4 and 5 turning spool shaft cap 55 counterclockwise until actuator 58 abuts the outer end 82 of torsion spring 81 causing the latter to release its frictional grip upon stub shaft 74 and to rotate with cap 55 and spool 20. Counterclockwise rotation of cap 55 before actuator 58 engages spring 81 tightens first biasing means spring 50, the biasing effect of spring 50 thereby being applied to spool 20. On counterclockwise rotation of spring 81, as seen in FIG. 5, under the urging of actuator 58 spring arm 82 engages and drives arm 76 and its integral interconnecting member 70 in a counterclockwise direction in FIGS. 4 and 5 winding the second spring biasing means 60 against its spring bias. The spring force of both springs 50 and 60 is thus applied upon spool 20 during a protraction movement of belt 16 while actuator 58 is engaging and driving spring arm 82 to hold the clutch spring 81 in a clutch released condition.

When belt 16 has been protracted to a position of use, and is allowed to retract slightly as occurs in normal manipulation of the belt in placing it in use, spool 20 revolves in a clockwise direction rotating cap 55 clockwise in FIG. 6 causing actuator arm 58 to release spring arm 82 which causes the clutch spring 81 to again tightly grip the stationary stub shaft 74 positioned about spool shaft 25. Spring 81 then holds interconnecting member 70 stationary, due to the abutment of interconnector member arm 76 and spring arm 82, blocking out the bias of the second biasing spring means 60 acting between housing 41 and the interconnecting member 70. With the clutch spring 81 in a clutch holding position as seen in FIG. 6, only the rewind biasing effect of spring means 50 is being applied due to its position between then stationary interconnecting member 70 and the spool shaft end cap 55.

This spring means 50 may be provided of a sufficient spring force to provide a desired low tension on the safety belt 16 when spring means 60 is held in an inactive position by clutch spring 81. It may be desirable to employ a stronger spring for spring means 60 to accentuate the reduced tension affect of spring 50 and to improve rewind of webbing on spool 20. A "low tension zone" effect is provided by the within retraction means while clutch spring 81 holds interconnecting member 70 stationary, as aforedescribed. This "low tension zone" effect continues for a limited belt retraction movement determined by the extent of travel afforded due to a counterclockwise rotation of spool end cap 55 from the position of FIG. 5, through the position of FIG. 6 and back to the position of FIG. 4. On a retraction movement of belt 16 sufficient to bring cap 55 into the position of FIG. 4, actuator arm 58 abuts the inward end 83 of clutch spring 81 releasing the clutch spring from stub shaft 74 and allowing for a retraction of belt 16 under the urging of spring 51, the spring 61 functioning to keep spring 51 in a wound up state so that it can provide a force for winding up the belt during full retraction.

FIRST ALTERNATIVE EXEMPLARY EMBODIMENT

A first alternative exemplary embodiment of clutch operated reduced tension safety belt retraction means in accordance with the present invention is illustrated in detail in FIGS. 7 through 10. Referring firstly to FIG. 7, this alternative exemplary embodiment in retraction means is indicated generally at 140 in association with a safety belt retractor, indicated generally at 110, which may be constructed in the same manner as that illustrated in association with the foregoing description of the preferred exemplary embodiment. As seen in FIG. 7, the exemplary retractor includes a side wall 112 to which the housing 141 is mounted with the retractor spool shaft 125 extending outwardly of side wall 112 into housing 141.

A first spring biasing means, indicated generally at 150, is shown interconnected between spool shaft 125 and an interconnecting member 170 which in turn is connected to a second spring biasing means 160. As seen in FIGS. 7 and 8, the spring biasing means indicated generally at 150 includes a coil spring 151 having an inner end 152 secured within end slot 157 of spool shaft 125. An outer end 153 is wound about an arm 171 of interconnecting member 170. Interconnecting member 170 includes a stub shaft 172 rotatably mounted within housing end boss 142, as seen in FIG. 7, at its outer end and via a blind bore 173 upon an outer end of spool shaft 125. Shaft 125 is free to rotate under the urging of spring means 150 relative to interconnecting member 170 when the latter is held stationary be clutch means hereinafter explained.

Second spring biasing means, indicated generally at 160, includes coil spring 161 having an outer end 162 connected by suitable fasteners 163 to housing 141 and an inner end 164 secured within end slot 174 of stub shaft 172. Spring means 160 therefore normally biases interconnecting member 170 in a belt rewind direction subject to the action thereon of the friction clutch means indicated generally at 180.

The friction clutch means, indicated generally at 180, in this alternative exemplary embodiment, comprises a torsion spring 181 which is of the radially expanding type, as seen in FIGS. 7 and 8, so that it normally tends to tightly grip the inner surface 143 of housing 141. As seen in FIGS. 8 and 10, interconnecting member 170 is provided with a stop arm 176 which is positioned between the radially inwardly directed spring end arms 182 and 183. Clutch spring 181 is therefore provided to normally grip tightly on the inner surface 143 of housing 141 to trap stop arm 176 between its spring ends 182 and 183 and thus block out the biasing effect of spring 160 acting upon the interconnecting means 170.

Actuator means in this alternative exemplary embodiment comprise the provision of actuator arm 158 on actuator disc 155 which is keyed by key member 156 to an appropriate slot in spool shaft 125 to rotate in unison therewith.

On protraction of belt 116, as seen in FIG. 8, spool shaft 125 is rotated counterclockwise in FIG. 8 to move actuator arm 158 against clutch spring end arm 182 releasing clutch spring 181 from its tight engagement within housing 141 and causing it to rotate counterclockwise as well. Such rotation of clutch spring 181 drives arm 176 and interconnector member 170 clockwise against the biasing effect of spring means 160. The combined spring forces of springs 150 and 160 are therefore applied during a protraction of belt 116 as aforedescribed.

When the safety belt 116 has been protracted to a position of use, and the belt is allowed to retract slightly, the retractive movement of belt 116, as seen in FIG. 9, causes a clockwise rotation of spool shaft 125 which moves actuator arm 158 away from clutch spring arm 182. On release of clutch spring 181 by member 158, clutch spring 181 again expands against the surrounding surface 143 of housing 141 to hold interconnector member 170 stationary through engagement with stop arm 176. This blocks out the biasing effect of spring 160 leaving the lighter rewind biasing effect of the smaller spring 150 acting upon the spool 120 through shaft 125. The retraction means operates in this reduced tension "low tension zone" condition until belt retraction allows movement of actuator arm 158 under the urging of spring means 150 through a clockwise revolution around and into engagement with the other clutch spring end arm 183 as shown in dotted line in FIG. 9. Actuator 158 then releases clutch spring 181 allowing the spring means 160 to keep the spring 151 in a wound up state while the force of spring 151 is applied to the spool to effect a rewind retraction of belt 116 on spool 120.

Having thus described a preferred exemplary embodiment, and one alternative exemplary embodiments of clutch operated dual tension safety belt retraction means in accordance with the present invention, it should be noted by those skilled in the art that various modifications, adaptations and further alternatives may be made within the scope of the present invention which is defined by the following claims.

I claim:

1. A safety belt retractor having a safety belt wound upon a spool rotatably journaled in a retractor frame comprising:

first biasing means for biasing said spool in a belt rewind direction and second biasing means for biasing said first biasing means in a manner to cause said first biasing means to maintain its bias on said spool during full belt retraction;

friction clutch means interconnected between said second biasing means and said frame for selectively blocking out the bias of said second biasing means; and actuator means connected to said spool and engageable with said friction clutch means for operating said clutch means to selectively block and unblock the bias of said second biasing means upon said first biasing means in response to rotation of said spool in a predetermined manner.

2. The retractor of claim 1 wherein said friction clutch means comprises:

an interconnecting member interconnected between said second biasing means and said frame, said member having an arm portion;

a cylindrical member provided on said frame; and a confining torsion spring seated about said cylindrical member on said retractor frame with opposite free ends thereof lying in generally adjacent relation about said arm portion of said interconnecting member and on engagement by said actuator means, said torsion spring expands and loosens about said cylindrical member to free said interconnecting member from said cylindrical member.

3. The retractor of claim 1 wherein said friction clutch means comprises:

an interconnecting member interconnecting said second biasing means and said frame, said member having an arm portion;

a cylindrical housing on said retractor frame; and an expanding torsion spring seated within said cylindrical housing on said retractor frame with opposite free ends thereof lying in adjacent relation about said arm portion of said interconnecting member whereby said spring ends block movement of said interconnecting member and on engagement by said actuator means said torsion spring contracts and loosens within said cylindrical housing and frees said interconnecting member from said housing.

4. A safety belt retractor having a safety belt wound upon a spool rotatably journaled in a retractor frame comprising:

first biasing means for biasing said spool in a belt rewind direction and a second biasing means for biasing said first biasing means and being wound by said belt unwinding rotation of said spool, said second biasing means being provided to act on said first biasing means during belt winding rotation of said spool; and means for selectively blocking out the bias of said second biasing means, wherein said actuator means for selectively blocking out the bias of said second biasing means includes means operable in response to a slight retraction movement of said spool following unwinding of said belt to a position of use for blocking out the bias of said second biasing means.

5. A safety belt retractor having a frame, a safety belt storage spool mounted on said frame and biased toward a belt stored condition under a bias applied by a first spring means and a safety belt connected to said spool comprising:

a second spring means for biasing said first spring means and being wound by said belt unwinding rotation of said spool, said second spring means being provided to act on said first spring means during belt winding rotation of said spool;

means for relieving the first spring means of the bias applied thereto by said second spring means; and means for reapplying the bias of said second means on said first spring means in response to movement of said spool beyond a predetermined amount under the influence of the bias of said first spring means for rewinding said belt.

6. In a safety belt retractor having a frame, a spool rotatably journaled on said frame and a safety belt wound on said spool, the improvement comprising the provision of:

biasing means connected between said frame and said spool and including a first spring having one end connected to said spool and a second spring having one end connected to said frame, ends of said springs opposite said one ends, respectively, being connected to each other, whereby said second spring biases said first spring toward a wound up state; and means for controlling the application of the bias of said second spring on said first spring in response to unwinding and winding movement of said spool in a predetermined manner unrelated to the amount of belt unwound from said spool as said belt is placed in use.

7. The improvement in safety belt retractor of claim 6 wherein said biasing means further comprises:

means responsive to movement of said spool under the biase of the first spring for applying the bias of said second spring on said first spring for fully rewinding the belt when said spool movement exceeds a predetermined amount.

8. In a safety belt retractor having a frame, a spool rotatably journaled on said frame and a safety belt wound on said spool the improvement comprising the provision of:

spool biasing means mounted on said frame for applying a bias on said spool and additional biasing means for biasing said spool biasing means in a manner to cause said spool biasing means to maintain its bias on said spool during full belt retraction, said additional biasing means being operable in response to unwinding and winding movement of said spool as said belt is placed in use, wherein said additional biasing means includes means operable during spool retraction rotation for selectively blocking the bias of said additional biasing means.

9. The improvement in safety belt retractor of claim 8 which further comprises:
means responsive to movement of said spool under the bias of said spool biasing means for reapplying the bias of said additional biasing means on said spool biasing means for rewinding the belt when said movement exceeds a predetermined amount.

10. In a safety belt retractor having a frame, a spool rotatably journaled on said frame and a safety belt wound on said spool, the improvement comprising the provision of:
biasing means mounted on said frame for applying a spool rewind bias on said spool to be applied on unwinding of the belt and additional biasing means for biasing said spool biasing means in a manner to cause said spool biasing means to maintain its bias on said spool during a full belt retraction, the bias of said additional biasing means to be applied to said spool biasing means on rewinding the belt, the additional biasing means being operated in response to unwinding and winding movement of said spool in a predetermined manner unrelated to the amount of belt unwound from said spool as said belt is placed in use, and wherein said additional biasing means includes
means responsive to movements of said spool under the bias of the spool biasing means for selecting the application of the additional biasing means when said movement exceeds a predetermined amount.

11. In a safety belt retractor having a frame a belt storage spool rotatably mounted to said frame and a safety belt connected to and having belt portions stored on said storage spools for protraction and retraction relative to said frame, the improvement comprising the provision of:
first biasing means mounted on said frame for applying a first bias on said spool in a direction resisting unwinding of said belt from said spool to a position of use;
second biasing means mounted on said frame for applying a second bias on said first biasing means, said second bias being of a greater amount than said first bias;
means for selectively blocking out the bias of said second biasing means during retraction movement of said spool; and
means operable in response to a movement of said spool beyond a predetermined amount under the influence of said first biasing means for unblocking the bias of said second biasing means to act on said first biasing means during rewinding of said belt.

12. A seat belt retracting and winding device having a frame, a winding reel rotatably supported by said frame and a seat belt wound on said reel, comprising:
spring means connected between said frame and said winding reel and including a first spring connected to said reel at one end and a second spring connected to said frame at one end, opposite ends, respectively, of said first and second springs being connected to each other;
said winding reel being adapted to wind thereon a seat belt with a spring force of said first spring; and
means for controlling the application of spring force of said second spring on said first spring and operable in response to the rotation of said winding reel to apply only the force of said first spring during use of said seat belt said second spring acting to maintain said first spring wound up during full retraction of the seat belt onto said reel.

13. A seat belt retracting and winding device as defined in claim 12, wherein said controlling means includes clutch means for controlling the application of spring forces of said second spring to effect selectively said first and second conditions, and clutch control means operatively connected to said winding reel to operate said clutch means in accordance with the rotation of said winding reel due to paying out and winding of said seat belt.

* * * * *